(12) United States Patent
Badeau et al.

(10) Patent No.: US 6,366,942 B1
(45) Date of Patent: Apr. 2, 2002

(54) METHOD AND APPARATUS FOR ROUNDING FLOATING POINT RESULTS IN A DIGITAL PROCESSING SYSTEM

(75) Inventors: Roy W. Badeau, Berlin; William Robert Grundmann, Hudson; Mark D. Matson, Acton; Sridhar Samudrala, Westboro, all of MA (US)

(73) Assignee: Compaq Information Technologies Group LP, Houston, TX (US)

(*) Notice: Subject to any disclaimer, the term of this patent is extended or adjusted under 35 U.S.C. 154(b) by 0 days.

(21) Appl. No.: 09/281,501

(22) Filed: Mar. 30, 1999

Related U.S. Application Data (60) Provisional application No. 60/120,419, filed on Feb. 16, 1999, and provisional application No. 60/118,130, filed on Feb. 1, 1999.

(51) Int. Cl.[7] .................................................. G06F 7/50
(52) U.S. Cl. ...................................................... 708/497
(58) Field of Search .............................. 708/497, 505, 708/551

(56) References Cited

U.S. PATENT DOCUMENTS

| | | | |
|---|---|---|---|
| 5,550,768 A | * 8/1996 | Ogilvie et al. | 708/497 |
| 5,694,350 A | * 12/1997 | Wolrich et al. | 708/497 |
| 6,185,593 B1 | * 2/2001 | Brooks et al. | 708/497 |
| 6,199,089 B1 | * 3/2001 | Mansingh | 708/497 |
| 6,205,461 B1 | * 3/2001 | Mansingh | 708/497 |

OTHER PUBLICATIONS

Matson, M. et al., "A 600MHz Superscalar Floating Point Processor," paper on EV6 Fvox presented at European Solid–State Circuits Conference (Sep. 1998).

Gieseke, B.A. et al., "A 600MHz Superscalar RISC Microprocessor with Out–of–Order Execution," *1977 IEEE International Solid–State Circuits Conference Digest of Technical Papers*, pp. 176–177, 451.

Benschneider, B.J. et al., "A Pipelined 50–MHz CMOS 64–bit Floating–Point Arithmetic Processor," (reprint) *IEEE Journal of Solid State Circuits 24*:5, Oct. 1989.

Matson, M. et al., "Circuit Implementation of a 600MHz Superscalar RISC Microprocessor," *Proceedings of 1998 International Conference on Computer Design*, pp. 104–110 (Oct. 1998).

\* cited by examiner

*Primary Examiner*—David H. Malzahn
(74) *Attorney, Agent, or Firm*—Hamilton, Brook, Smith & Reynolds, P.C.

(57) ABSTRACT

A method and apparatus for operating on floating point numbers is provided that accepts two floating point numbers as operands in order to perform addition, a rounding adder circuit is provided which can accept the operands and a rounding increment bit at various bit positions. The circuit uses full adders at required bit positions to accommodate a bit from each operand and the rounding bit. Since the proper position in which the rounding bit should be injected into the addition may be unknown at the start, respective low and high increment bit addition circuits are provided to compute a result for both a low and a high increment rounding bit condition. The final result is selected based upon the most significant bit of the low rounding bit increment result. In this manner, the present rounding adder circuit eliminates the need to perform a no increment calculation used to select a result, as in the prior art. Through the use of full adders, the circuit not only accounts for the round increment bit, but can accept increment bits at any bit position to perform operations such as two's complement, thus further reducing the operations required to perform a desired floating point mathematical operation.

18 Claims, 7 Drawing Sheets

METHOD AND APPARATUS FOR ROUNDING FLOATING POINT RESULTS IN A DIGITAL PROCESSING SYSTEM

RELATED APPLICATIONS

This application claims the benefit of U.S. Provisional Patent Application having Ser. No. 60/120,419, filed Feb. 16, 1999, entitled "A Method and Apparatus for Rounding Floating Point Results in a Digital Processing System" and U.S. Provisional Application having Ser. No. 60/118,130, filed on Feb. 1, 1999, entitled "A Generalized Push-Pull Cascode Logic Technique", both of which are assigned to the assignee of the present invention and which are hereby incorporated by reference in their entirety.

FIELD OF THE INVENTION

This invention relates to processing systems which operate on floating point numbers, more specifically, the invention relates to an efficient mechanism for performing accurate mathematical rounding of such numbers.

BACKGROUND OF THE INVENTION

In digital computing systems, various types of numbers are electronically represented using the binary numbering system. Floating point numbers, such as $-1.73491*10^{-13}$ are typically represented in binary using either a VAX or an IEEE floating point standardized format. In either standard, the floating point number is represented as a group of bits divided into three bit fields: a sign bit field, an exponent bit field and a fraction bit field. The sign bit field represents the sign (negative in the above example) of the subject floating point number. The fraction bit field represents the digits surrounding and including the decimal point (i.e., 1.73491 in the above example). Finally, the exponent bit field (e.g. $-13$ in the above example) represents the multiplier of ten which indicates how many places and in which direction to shift the decimal point in the fraction part of the subject floating point number if it were to be expressed in typical decimal format.

Depending upon the standard in use, there are particular required formats used to represent the fraction and exponent bit fields. In the IEEE standard for normal numbers, the decimal point in the fraction bit field is always assumed to be located just to the right of the most significant bit position. For example, if there are 23 bits in the fraction bit field having bit positions ranging from 0 (rightmost bit) to 22 (leftmost and most significant bit), the decimal point is always assumed to be located between bit positions 22 and 21. In the VAX standard, the decimal point in the fraction bit field is always assumed to be located just to the left of the most significant bit position (to the left of bit position 22 in the above example). Also, in both the VAX and IEEE standards, a normal fraction value is always stored in a normalized state. A "normalized" fraction bit field always has the most significant non-zero bit located in the most significant (left most) bit position.

All exponents use an excess format, the exponent value is calculated by taking the unsigned value of the exponent bit field and subtracting a bias to produce the true exponent value. A bit field value of 1 represents the most negative true exponent, a bit field value of all one's represents the most positive true exponent, and the bit field value half way between 1 and all one's represents a true exponent value of zero.

The number of bits in the fraction bit field and the number of bits in the exponent bit field determines the precision and range (i.e., the number of significant digits and the maximum and minimum floating point numerical values representable) of a particular floating point format. Both the VAX and IEEE standards provide for single and double precision floating point numbers. Double precision floating point numbers use about twice as many bits for their fraction fields as single precision floating point numbers. A typical single precision floating point number requires a total of 32 bits to store the sign, fraction and exponent fields, while a typical double precision value requires a total of 64 bits for storage.

Various steps must be performed to add two floating point numbers using prior art floating point addition circuits. Before addition can take place, the exponent of the smaller magnitude operand must be adjusted so that it is equal to the exponent of the larger magnitude operand. This is accomplished by incrementing the smaller magnitude operand's exponent while shifting that operand's fraction appropriately such that the value of the combined fraction and exponent is maintained. As an example, if the first and second operands are $+0.1234*10^5$ and $+0.5678*10^7$ respectively, to perform the adjustment, the floating point processor adds two to the smaller exponent, i.e., the first operand's exponent ($10^5$), to equate it with the exponent of the second operand ($10^7$). To maintain the proper value for the smaller magnitude operand, its fraction must be shifted by two decimal places. The combined fraction and exponent becomes $+0.001234*10^7$ for the adjusted (first) operand.

After the alignment and shift steps are complete, the fraction bit fields (i.e., the fractional values) of the two operands are added in an addition step to produce a result reflecting the sum of the fractions of the operands. In this example, after the addition is complete the resultant sum is $+0.569034*10^7$. In some instances, depending upon the value of the resultant sum, the sum may then need to be normalized so that its most significant digit is in the proper decimal position for the resultant format. Normalization is not needed in the above case.

Furthermore, the resultant sum may also exceed the overall precision that can be represented by the floating point standard in use. For example, if the fraction bit field format only has enough bits to represent a precision of four decimal digits to the right of the decimal point, the example resultant fraction value 0.569034 exceeds the allowable precision by two digits. If the precision is exceeded, a rounding step is used to round the fraction up or down to fit within the maximum number of bits allocated for the fraction bit field.

In the VAX floating point standard, there are two rounding modes that can be used, and in the IEEE floating point standard there are four rounding modes that can be used to accomplish the rounding step.

In the IEEE standard, the first rounding mode is called "Round to Nearest Even" (RNE) and rounds values up in magnitude if they are more than half way between two representable results. Values that are exactly half way between two representable results are rounded to a final result that has a least significant fraction bit equal to zero, thus making the result even. Values that are less than halfway between two representable results are rounded down in magnitude (or truncated).

The second and third IEEE rounding modes are called "Round Toward Positive Infinity" (RTPI) and "Round Toward Negative Infinity" (RTNI). In the RTPI rounding mode, values that are between two representable results are rounded up for positive results and down in magnitude for negative results. In the RTNI rounding mode, values that are between two representable results are rounded up in magnitude for negative results and down for positive results.

The fourth IEEE rounding mode is called "Chopped" and rounds all results existing between two representable results down in magnitude by chopping off or eliminating any digits extending beyond the precision (i.e., number of decimal places) allowed.

In the VAX floating point standard, there are only two rounding modes; "Normal Rounding" and "Chopped." In Normal Rounding, values that are more than or exactly half way between two representable results are rounded up in magnitude. Values that are less than halfway between two representable values are rounded down in magnitude. The Chopped rounding mode in the VAX standard is the same as the IEEE standard and rounds results down in magnitude by chopping off or truncating any bits below the available precision.

Except for the Chopped rounding mode, all rounding modes are accomplished by conditionally incrementing the infinitely precise normalized initial sum at an appropriate bit position, re-normalizing if necessary, and then truncating all bits below the least significant bit position. After the initial normalized sum is computed, the rounding mode in effect determines a specific bit position in the sum at which to increment the result in order to create a fraction bit pattern representing a correctly rounded fraction value. The round increment may cause a carry bit to be propagated to the more significant bit positions in the sum. If the carry due to round increment causes the fraction value to exceed the allowed fraction magnitude, then the fraction must be re-normalized by shifting down in magnitude and the exponent needs to be incremented by one. After incrementing and re-normalizing, the final result is obtained by truncating at the least significant bit to position.

In summary, prior art floating point processors that provide mathematical operations need a final addition and rounding function which requires the following steps; 1) Add, 2) Adjust/ Normalize, 3) Round and 4) Adjust/Renormalize. A floating point adder that performs these steps in one operation is called a rounding adder and is typically implemented in a floating point unit as circuitry within a microprocessor.

Note that the earlier steps always provide prealigned operands to the addition step (Step 1). The resultant sum produced by the add therefore always contains a leading non-zero digit (i.e., the most significant bit or MSB) that is guaranteed to be in one of two possible bit positions; either properly normalized or needing a one bit shift to be properly normalized. So, the normalization in step 2 may or may not require a single bit shift, depending on the bit position of the MSB in the sum result from step 1. If the shift is needed, every bit in the fraction bit field is shifted. However, whether a shift is required or not is problematic for combining steps 1 through 4 in one operation because the round increment in step 3 requires the shift result from step 2 which requires the sum from step 1. At the start of step 1, only the two operands and a round increment value are known. As such, upon initial receipt of these three inputs, prior art rounding adders make it difficult to determine the bit position where the round increment bit will be needed for the rounding operation that occurs in Step 3. This is due to the fact that a shift operation may or may not be needed in Step 2. In other words, the proper bit position required for the round increment bit is unknown at the start because it is not known until after the addition (Step 1) if the adjust step (Step 2) will be needed.

Prior art implementations of rounding adders handle the uncertainty of the round increment bit position by using three separate addition circuits. One circuit performs addition without any round increment bit and computes a first result. The second circuit accepts the round increment bit at a low round increment bit position and computes a second result. Finally, a third circuit accepts a round increment bit at a high round increment bit position and computes a third result. In essence, three separate addition operations are performed using separate circuits. After all three results are obtained the correct result is selected (from the second and third results) based upon the most significant bit that exists in the first result.

The second and third rounding adder circuits must add two operands (i.e., bit strings) in conjunction with a round increment bit injected into the addition operation at specific high and low round increment bit positions. One problem encountered in performing these additions is that the round increment bit may need to be added to a bit position which already needs to add two operand bits plus a carry in from a lower bit position. The four bits required to be added in this one bit position can not be represented as a simple resultant sum and carry out.

To avoid extra circuitry required to ensure that rounding bits are properly carried and propagated, a series of half adders are used to receive the bits of the operands. A single half adder accepts two bits and produces a sum bit and a carry output bit. The carry output bit is used as an input to the next more significant bit position. An example will best explain how the addition of a half adder assists the addition circuitry used in the prior art.

The example below illustrates the results of a half adder used to add two operands and a rounding increment bit inserted at the K bit position. In the first example, without a half adder present at the inputs, two operands and a round increment bit can be added as follows:

| Bit Position: | JKLR |
|---|---|
| Operand A: | 1111 |
| Operand B: | 1110 |
| Round Bit: | 0100 |
| Result: | 100001 |

However, with a half adder which first accepts the two operands (A and B) and converts them to a Sum and Carry string, the following result is obtained:

| Bit Position: | JKLR |
|---|---|
| Sum of A + B: | 0001 |
| Carry of A + B: | 1110 |
| Round Bit: | 0100 |
| Result: | 100001 |

The final result is the same in each case. However, for the addition without the half adder, notice that the K bit position has to both generate a carry bit and also propagate a carry bit from the L bit position. Thus there are two carries from the K bit position into the J bit position. When the same operands are pre-processed through the half adder stage as shown in the second example, there is only one carry bit created from the K bit position into the J bit position. The result is the same but the physical implementation of the circuit is simplified using a half adder due to the fact that multiple carry bits do not need to be generated and/or propagated which requires additional circuitry and processing time.

SUMMARY OF THE INVENTION

Prior art rounding adders suffer from a number of problems. The requirement for three separate addition circuits to accommodate calculations for a high increment rounding bit, a low increment rounding bit, and no rounding bit requires extra processing time and space and also uses more power.

A total of four processing steps are required to perform the entire floating point round addition found in the prior art. The four steps used in the prior art result in a slower floating point addition circuit which in turn results in slower overall floating point mathematical calculations. As will be explained, the present invention provides a mechanism to condense the number of steps needed to perform the same overall operation to one step and eliminates the need to calculate an addend using no round increment bit.

The invention overcomes the shortcomings of prior art rounding adders. The invention uses full adders at those bit positions which must accommodate each operand as well as a rounding increment bit. Since the rounding bit is handled by the full adders, multiple carries from a single bit position continue to be avoided. The use of full adders also eliminates certain steps that are required in the prior art floating point addition operation. Specifically, special adder circuits that provide addition of three bits in certain bit positions, and the need for threshold logic are eliminated. The steps of addition, adjusting, rounding and then further adjusting can be combined in a more standard carry propagate adder.

The invention also eliminates the need for performing a no rounding increment addition calculation. This third and unnecessary computation is removed by this invention as a result of the discovery that the most significant bit of the addition result produced from adding a rounding increment bit at a low increment bit position can be used to select a correct result from either the low or a high rounding increment addition result.

More specifically, the present invention provides a method and apparatus for performing rounded floating point additions on first and second operands. The apparatus is called a rounding adder circuit.

The rounding adder circuit includes a low increment adder circuit that accepts as input the first and second operands and a low increment bit injected into a first pre-selected low order bit position. The first pre-selected low order bit position is selected based upon a function of the rounding mode in effect and upon the desired mathematical operation being performed. The low increment adder circuit adds the first and second operands and the low increment bit and accounts for any carry bits generated from the addition and produces a low increment result. A low increment sum logic circuit is included and performs sum logic functions on the low increment result based upon the desired mathematical operation to produce a final low increment result.

The rounding adder circuit also includes a high increment adder circuit accepting as input the first and second operands and a high increment bit injected into a second pre-selected low order bit position. The second pre-selected low order bit position is also selected as a function of the rounding mode in effect and the desired mathematical operation being performed. The high increment adder circuit adds the first and second operands and the high increment bit, and accounts for any carry bits generated and produces a high increment result. A high increment sum logic circuit performs sum logic functions on the high increment result based upon the desired mathematical operation to produce a final high increment result. An output selection circuit selects either the final low increment result or the final high increment result depending upon a most significant bit of the final low increment result.

Through the use of only a high and low increment addition circuit, with the final result being selected based upon the most significant bit of the low increment result, the rounding adder eliminates the prior art requirement of a no increment addition circuit. This simplifies floating point unit circuit design and reduces real estate and power requirements on a microprocessor implementation of the rounding adder circuit.

Another advantage of the invention is that the low increment adder circuit and the high increment adder circuit share a high order bit addition circuit. This single high order bit addition circuit includes half adders coupled in sequence, with one half adder per high order bit position of the first and second operands. Each half adder accepts as input a respectively positioned high ordered bit from each of the first and second operands. Each half adder performs an addition operation and produces a half adder result for that bit position. By using half adders where there are only two inputs, and full adders where there are three inputs, the invention circuit accommodates the rounding increment bits more efficiently than prior art rounding adders.

A series of high order propagate-generate-kill (PGK) circuits coupled in sequence is also included in the high order bit addition circuit. In particular there is one propagate-generate-kill circuit per high order bit position of the operands. Each high order propagate-generate-kill circuit accepts as input the half adder result from the half adder in its respective bit position and performs a process of either propagating, generating or killing a carry bit for its respective bit position to produce a high order PGK result.

For addition of the low order bits of the operands, which are the lowest four bit positions in the preferred embodiment, the low order bit addition circuit provides a plurality of low increment full adders coupled in sequence, one per low order bit position of the first and second operands. Each low increment full adder accepts as input a respectively positioned low ordered bit from the first operand, a respectively positioned low ordered bit from the second operand, and a low increment bit. Each low increment full adder performs an addition operation and produces a low increment full adder result for that bit position.

Also part of the low increment adder circuit and coupled to the low increment full adders are a plurality of low increment propagate-generate-kill circuits coupled in sequence, one per low order bit position in the operands. Each low increment propagate-generate-kill circuit accepts the low increment full adder result from the full adder in its respective bit position and performs a process of either propagating, generating or killing a carry bit for its respective bit position, to produce a low increment PGK result.

Existing and operating in symmetry with and in parallel to the low increment adder circuit is a high increment adder circuit. The high increment adder circuit construction is the same as the low increment adder circuit except that the high increment adder circuit accepts as input a high increment bit as the third input at each fill adder, instead of a low increment bit, and the high increment adder circuit produces a high increment PGK result.

The low order bit addition circuit includes low and high increment carry logic circuits which accept as input the respective low and high increment PGK results. The low and high increment carry logic circuits operate in parallel and are symmetrical and each determines if a respective low or high increment carry bit is present in the respective low or high increment PGK result. If so, the low and high increment carry logic circuits output the respective low or high increment carry bit and a low order low or high increment result.

For the high order bits, the high order PGK result is input into a dual carry logic circuit. One part of the dual carry logic is a low increment carry chain which combines the high order PGK result with the low increment carry bit to propagate the low increment carry bit within the high order PGK result to produce a high order low increment result. A second part of the dual carry logic circuit is a high increment carry chain which combines the high order PGK result with the high increment carry bit, to propagate the high increment carry bit within the high order PGK result, to produce the high order high increment result.

The sum logic circuits for the high and low order bits ensure that the carry bits generated from the addition operation are properly accounted for in the results of the operand additions for both the high increment result and the low increment result.

The low increment sum logic circuitry includes low order low increment sum logic circuitry and high order low increment sum logic circuitry. The high increment sum logic circuitry includes low order high increment sum logic circuitry and high order high increment sum logic circuitry. Each of these sum logic circuits performs sum logic functions on respective results to produce a final low increment result and a final high increment result.

Accordingly, after the invention has added the operands in combination with both the low and high increment rounding bits and has performed any necessary sum logic, two final results are present. The invention then uses the most significant bit of the final low increment result to select one of the final high or low increment results as being the correct final result. In addition during the final result selection, the invention also combines the steps of shifting and adjusting after the round operation.

The invention provides the advantages of being able to inject a rounding bit or other increment bit at any bit position, by using full adders at those bit positions where two operand bits and an increment bit are to be received. The precise bit positions at which the high and low increment bits are injected into the addition operation are dependent upon the desired mathematical operation, the rounding mode in effect, and the input operands. By selecting the proper pre-determined positions, the rounding adder circuit computes a correct result with no need for the third no-increment addition operation of the prior art. In effect, the four steps of the prior art are reduced to one step by this invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
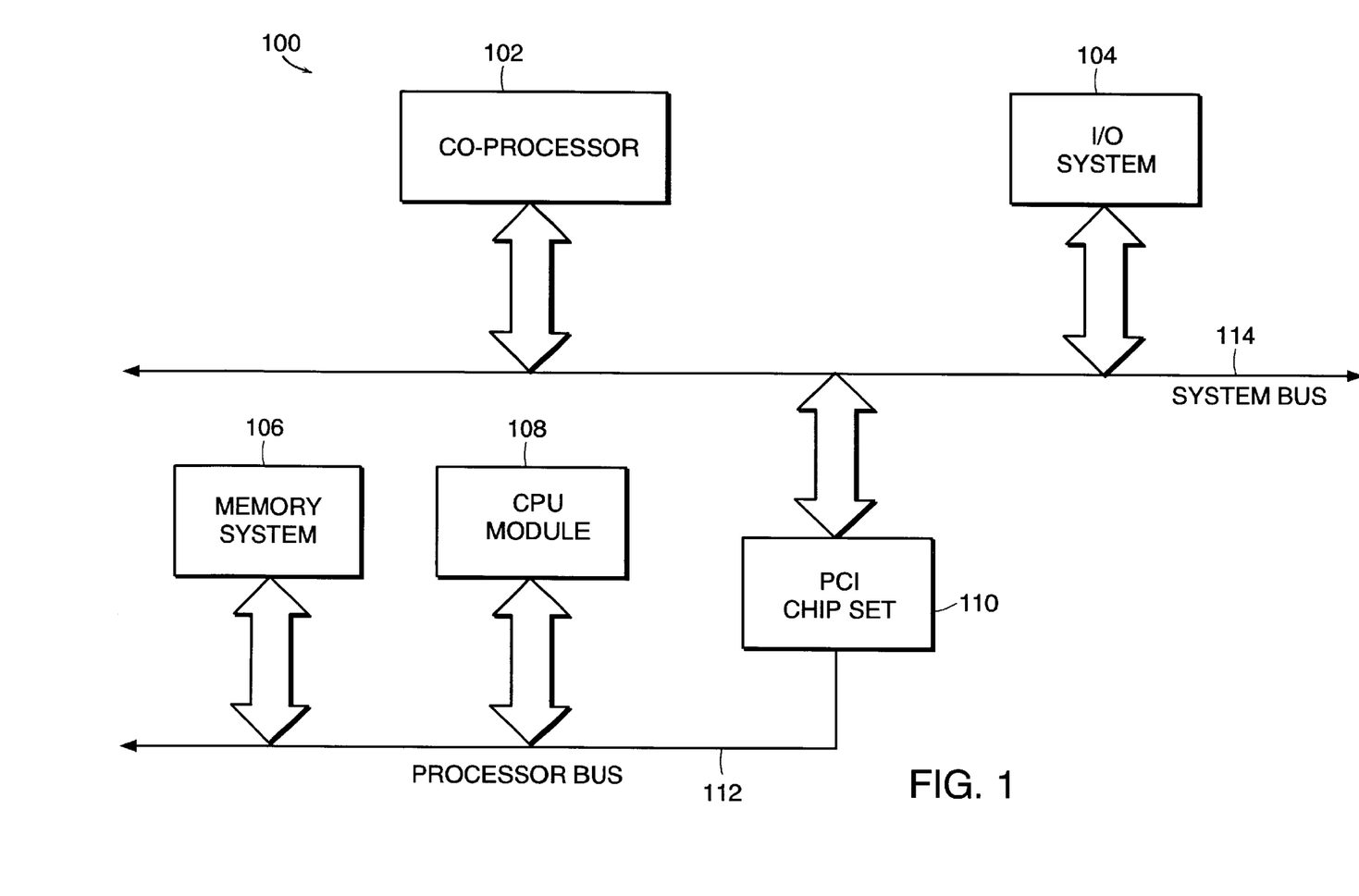
FIG. 1 is a block diagram providing an overview of a computing system including a CPU module.

FIG. 1 is a block diagram of a computer system 100 that includes a Central Processing Unit ("CPU") module 108, a memory system 106 and a PCI chip set 110 connected by a processor bus 112. The PCI chip set 110 is further connected to an Input/Output ("PO") system 104 and a co-processor module 102 by a system bus 114.

Figure 2:
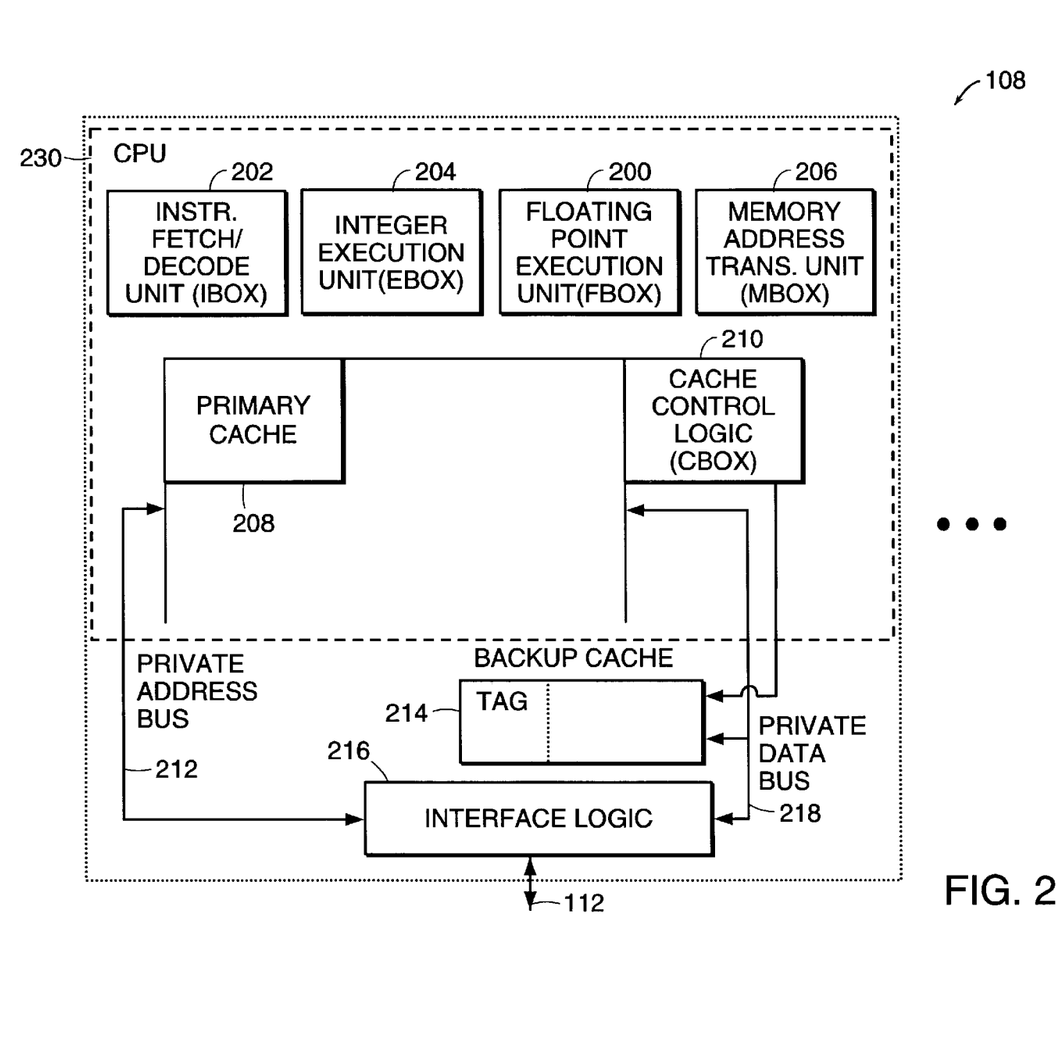
FIG. 2 is a block diagram providing an overview of the CPU module including a Floating Point Execution Unit (FBOX).

FIG. 2 shows the CPU module 108 shown in FIG. 1. The CPU module includes a CPU 220, a backup cache 214 and a system bus interface 218 connected by a private address bus 212 and a private data bus 218. The system bus interface connects the CPU module 108 to the processor bus 112. The CPU 220 includes a primary cache 208 and a cache control logic 210. A cache control logic (CBOX) 210, controls the primary cache 208 in the CPU 220 and the backup cache 214.

CPU 220 further includes logic circuits to enable it to perform operations for the computer system 100. An Instruction Fetch and Decode Unit (IBOX) 202, performs instruction prefetch, decode, branch prediction, instruction issuance and interrupt handling operations. An Integer Execution Unit (EBOX) 204, performs operations on integer values such as, addition, shifting, byte manipulation, and multiplication. A Floating Point Execution Unit (FBOX) 200, performs operations on floating point values such as, addition, square root, division and multiplication. A Memory Address Translation Unit (MBOX) 206, performs memory address translation, for example, from virtual memory addresses to physical memory addresses.

Figures 3, 4:
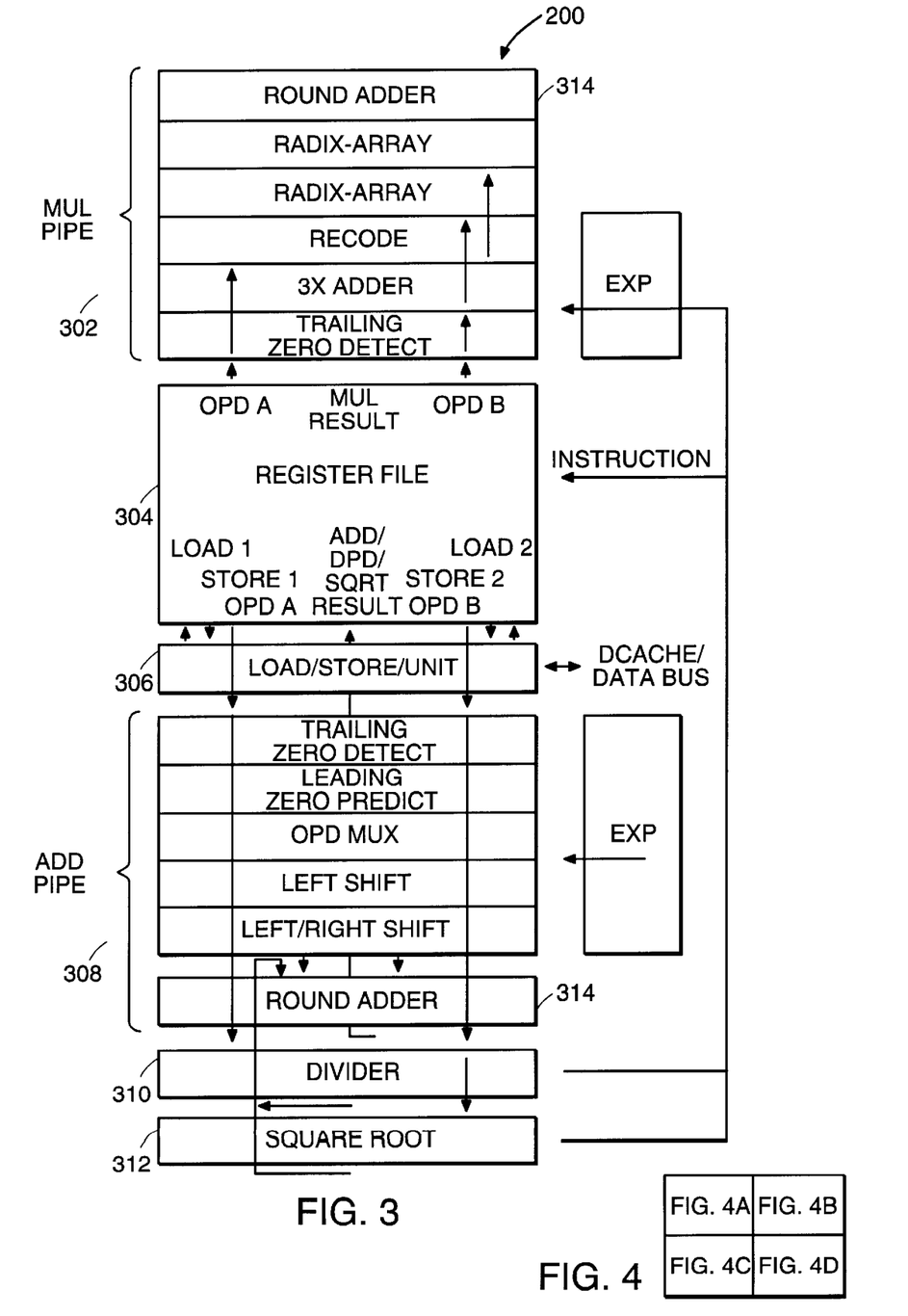
FIG. 3 is a block diagram providing an overview of the Floating Point Execution Unit (FBOX) including a Round Adder.
FIG. 4 illustrates a schematic diagram of the Round Adder circuit configured according to the invention.
Figure 4A:
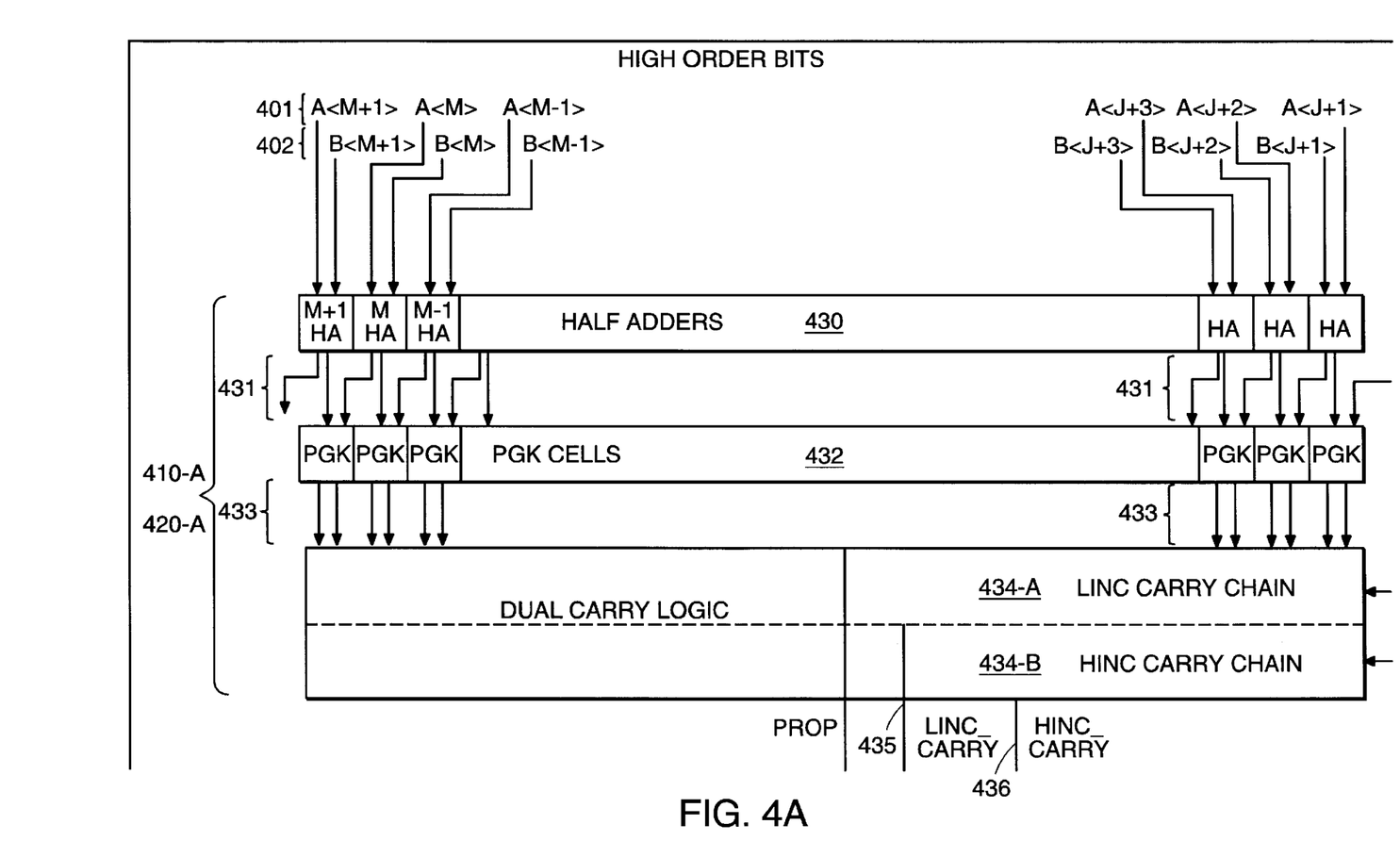
Figure 4B:
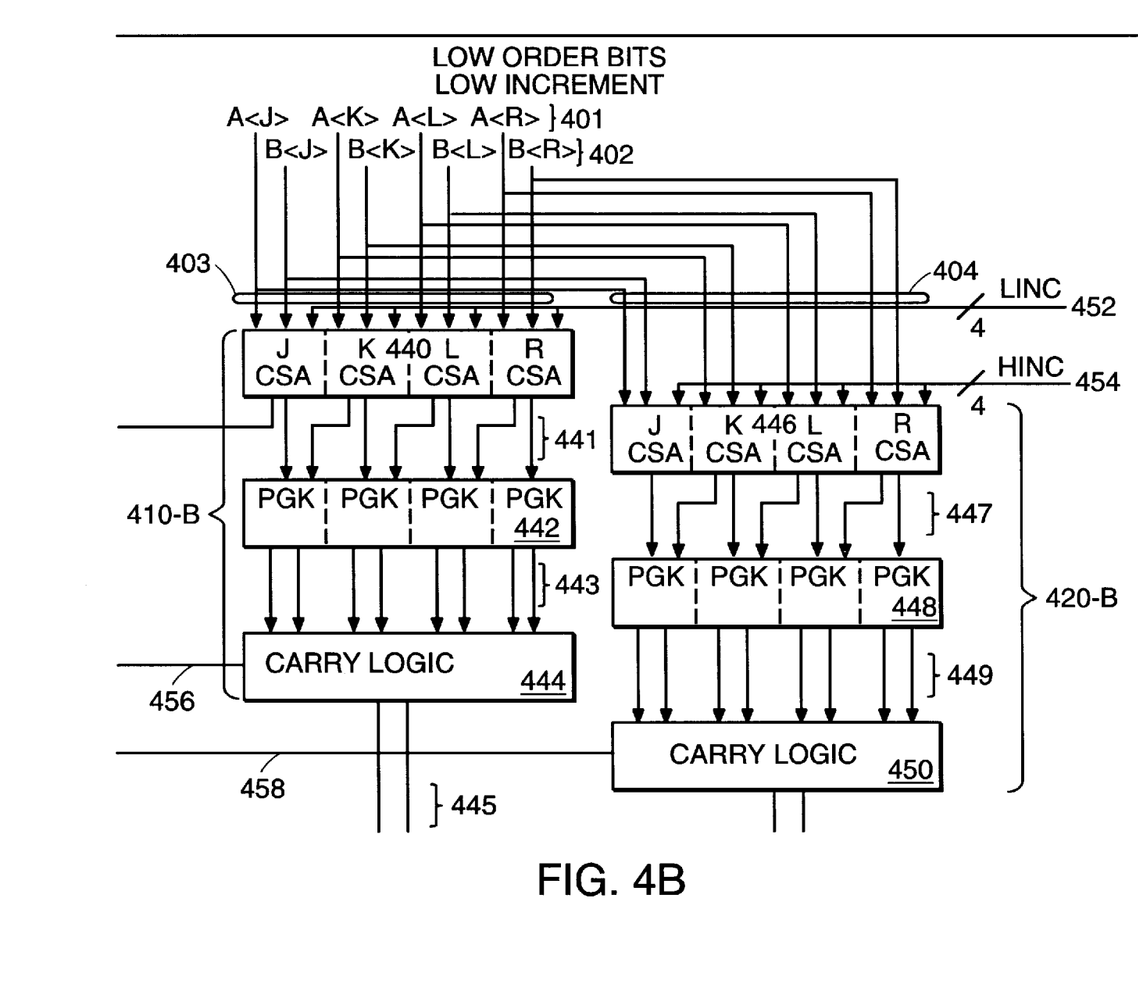
Figure 4C:
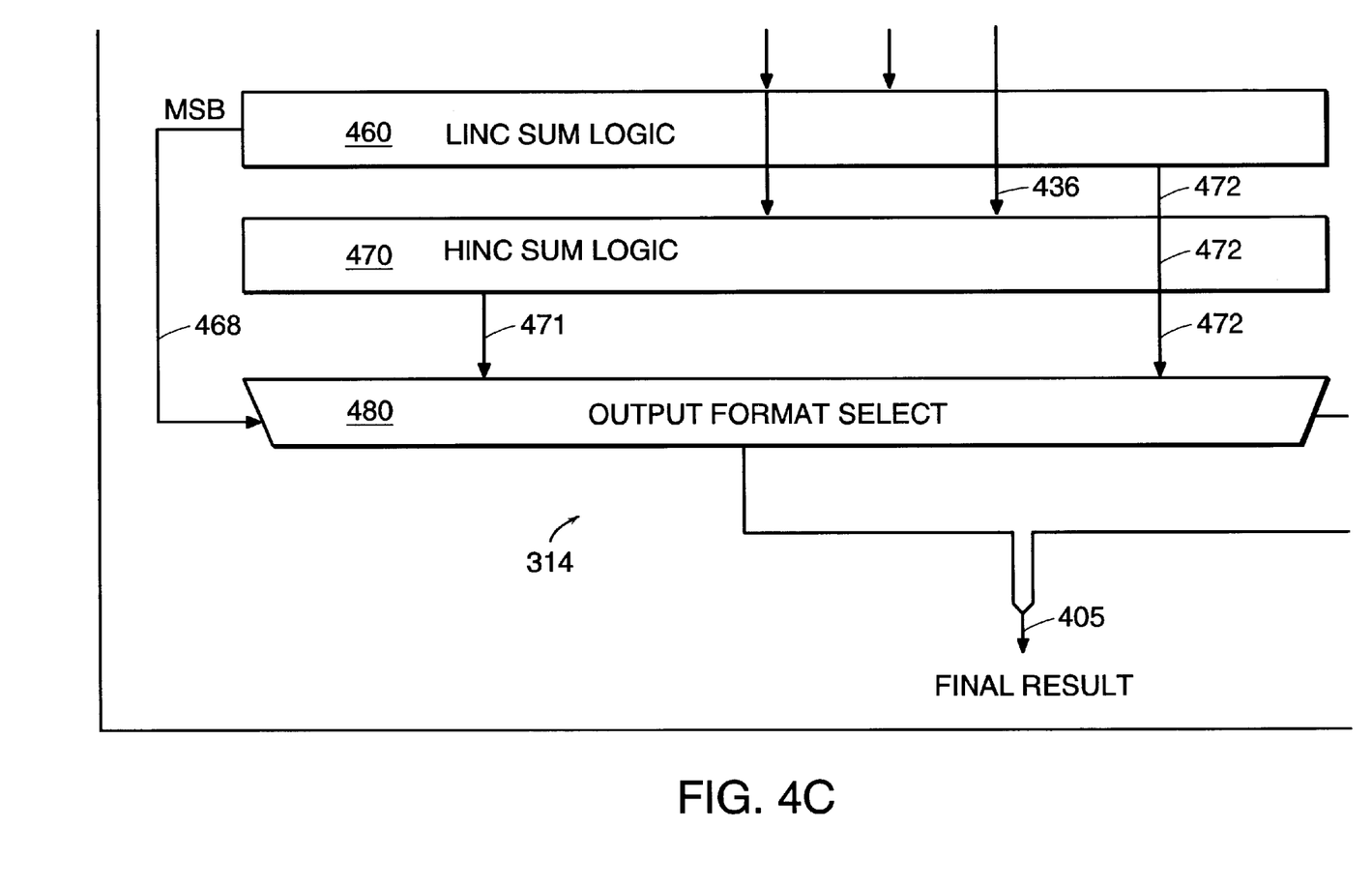
Figure 4D:
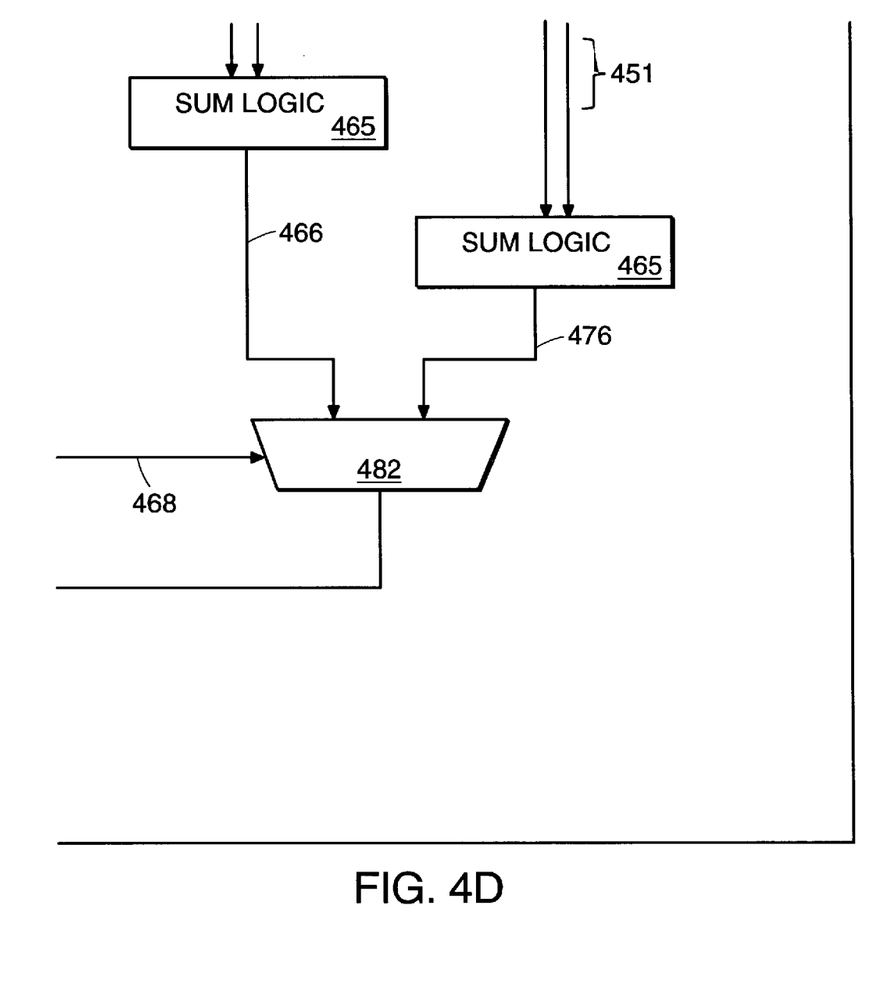

FIG. 3 is a block diagram of a Floating Point Execution Unit (FBOX) 200 that includes a Mul Pipe 302, a Register File 304, a Load/Store Unit 306, an Add Pipe 308, a Divider 310, and a Square Root unit 312. The Add Pipe 308 contains a Round Adder 314 which performs a rounding addition operation to produce floating point results.

FIG. 4 describes a preferred embodiment of the invention, it illustrates a schematic diagram of a rounding adder circuit 314 configured according to this invention. The rounding adder circuit 314 accepts the aligned fractions of the floating point numbers (i.e. operand A 401 and operand B 402) as input, as well as a set of low increment rounding bits on lines 452 and a set of high increment rounding bits on lines 454. According to the invention, rounding adder circuit 314 performs a desired addition with rounding and normalization on operands A 401 and B 402 and produces a final result C 405.

Operands A 401 and B 402 are each comprised of a plurality of bit positions which are logically divided into low and high order bit positions. Low order bit positions are labeled J, K, L and R and high order bit positions begin at bit position J+1 and continue through bits M−1, M and M+1, as illustrated in the figure. Operands A 401 and B 402 represent the bits from fraction bit fields of two floating point numbers with which the rounding addition is to take place.

The rounding adder circuit 314 includes all of the logic circuitry required to perform the desired mathematical operation of addition with rounding. As explained above, prior art circuits that perform these mathematical operations use a complex series of four or more steps that require at least three separate addition processing circuits to handle different rounding conditions that are required. The present invention rounding adder circuit 314 accomplishes the same mathematical operations in fewer steps and with less complicated circuitry, thus decreasing the time required to perform floating point calculations. Physical space and power requirements of rounding adder circuit 314 are also reduced.

The structure of rounding adder circuit 314 will be presented next, followed by a complete description of its operation.

Rounding adder circuit 314 comprises a low increment adder circuit 410 and a high increment adder circuit 420. Each circuit 410, 420 processes all of the bits from each operand A 401 and B 402. However, the low increment adder circuit 410 accepts operands A 401 and B 402 as input in conjunction with a set of low increment rounding bits on lines 452, while the high increment adder circuit 420 accepts operands A 401 and B 402 as input in conjunction with a set of high increment rounding bits on lines 454.

Both the low and high increment adder circuits 410, 420 share a single high order bit addition circuit 410-a, 420-a to process the high order bits of each operand A and B 401, 402. The high order bit addition circuitry 410-a, 420-a of both the low and high increment adder circuits 410, 420 includes a half adder circuit 430 coupled in service to a high order propagate-generate-kill (PGK) circuit 432, which is coupled in series to a dual carry logic circuit 434. Circuits 430, 432 and 434 perform floating point addition only on the high order bits (i.e., bit positions J+1 through M+1) of operands A 401 and B 402, but can accept and account for any carry bits generated by low order bit processing, as will be explained.

The half adder circuit 430 comprises a series of half adders (HA) coupled in parallel which collectively add together a bit from each operand A 401 and B 402 at each respective bit position. The half adder (HA) at each bit position generates a sum and a carry bit which when combined are collectively referred to as the half adder result 431. For example, each bit position J+1 through M+1, the PGK circuit 432 accepts the respective half adder result 431 and either propagates, generates or kills the carry bit associated with the bit position, to produce a high order PGK result 433. The high order PGK result 433 is then input into the dual carry logic circuit 434 which accounts for any carry bits that may be required to be carried from one bit position to higher bit positions within the high order PGK result 433. As will be explained, carry bits may be generated from the low order bit operations which must then be properly handled by the dual carry logic circuit 434 for the high order bit positions.

To process the low order bits J, K, L and R of each operand A 401 and B 402, the low and high increment adder circuits 410 and 420 provide separate but symmetrical low order addition circuits 410-b, 420-b. That is, while the high order bits (J+1 through M+1) of each operand A 401 and B 402 are processed together by the same high order bit addition circuits 430, 432 and 434, there is a separate low order, low increment bit addition circuit 410-b that exists as part of the low increment adder circuit 410, plus there is a separate low order, high increment bit addition circuit 420-b that exists as part of the high increment adder circuit 420.

In particular, low order, low increment bit addition circuit 410-b is formed of circuits 440, 442 and 444. Low Order, high increment bit addition circuit 420-b is formed of circuits 446, 448 and 450. Circuits 440, 442 and 444 process low order bits from operands A 401 and B 402 in one manner, while low order high increment bit processing circuits 446, 448 and 450 process low order bits of the operands A 401 and B 402 in another manner; more specifically, upon the input of operands A 401 and B 402, the low order bits J, K, L and R of each operand 401, 402 are duplicated into two sets of J, K, L and R low order bit pairs 403, 404. The first set of low order bit pairs 403 is processed in conjunction with the low increment rounding bits on lines 452, while the second set of low order bit pairs 404 is processed in conjunction with the high increment rounding bits on lines 454.

Structurally, the low increment adder circuit 410 processes the first set of low order bit pairs 403 from each operand 401, 402 in conjunction with the low increment bit set on lines 452 via a low increment full adder circuit 440, coupled to a low increment PGK circuit 442, which is in turn coupled to a low increment carry logic circuit 444. Circuits 440, 442 and 444 are collectively referred to as the low increment low order addition circuit (i.e., 410-b). In a similar manner, the high increment adder circuit 420 processes the second set of low order bit pairs 404 via a high increment full adder circuit 446, coupled to a high increment PGK circuit 448, which is in turn coupled to a high increment carry logic circuit 450. Circuits 446, 448 and 450 are collectively referred to as the high increment low order addition circuit (i.e., 420-b).

The high and low increment low order addition circuits 410-b, 420-b operate in a similar manner as their high order circuit counterparts 410-a, 420-b. The only differences being that the low increment full adder circuit 440 is comprised of a series of full adders 440-J, 440-K, 440-L and 440-R, while the high increment full adder circuit 446 is comprised of a series of full adders 446-J, 446-K, 446-L and 446-R, and bits 403 and 404 are processed in parallel, in respective circuits 440, 446.

Essentially, there is one full adder, also called a Carry-Save-Adder or CSA, at each low order bit position J, K, L and R in each full adder circuit 440, 446. Each full adder accepts three inputs: a bit from each operand A 401 and B 402, and either the high or low increment bit present on a respective high or low increment bit line 452 or 454 associated with that bit position. Each full adder 440, 446 generates a sum and carry bit as output. The sum and carry bits produced from the low increment full adder circuit 440 are collectively referred to as the low increment full adder result 441, whereas the sum and carry bits produced from the high increment full adder circuit 446 are collectively referred to as the high increment full adder result 447.

For each of the low order bit positions, the low and high increment full adder results 441, 447 are received as input by respective low and high increment PGK circuits 442, 448. Each low order PGK circuit 442 and 448 operates similarly to the high order PGK circuit 432 by propagating, generating or removing (i.e., killing) the carry bit associated with a bit position, if a carry bit is present. Respective low order, low and high increment PGK circuits 442 and 448 produce respective low and high increment PGK results 443 and 449, for each of the low order bit positions.

The low and high increment PGK results 443 and 449 are received by respective low and high increment carry logic circuits 444 and 450. Carry logic circuits 444 and 450 account for carry bits produced by less significant bit positions within the low order bit positions J, K, L and R. The low increment carry logic circuit 444 produces low order carries and propagates 445 which reflect the addition of operand A 401, operand B 402 and the low increment rounding bit injected via lines 452. The high increment carry logic circuit 450 produces low order carries and propagates 451 which reflect the addition of operand A 401, operand B 402 and the high increment rounding bit injected via lines 454.

Carry logic circuits 444 and 450 also produce respective low and high increment carry bits on lines 456 and 458. If a low and/or high increment carry bit is produced, lines 456 and/or 458 will be asserted. A carry bit on either lines 456 and/or 458 may result after the low increment addition circuits 440, 442 and 444 and the high increment addition circuits 446, 448 and 450 have performed their respective addition operations on the low order bits J, K, L and R of the operands A 401 and B 402 in conjunction with the rounding increment values present on respective low and high increment carry bit lines 452, 454. Any carry bit on either line 456 and/or 458 must be propagated beyond the J bit position of the low order bits, into the high order bits. That is, carry bits from addition of low order bits J, K, L and R can affect high order bit position J+1 and possibly other high order bit positions (i.e., J+2, J+3, and so forth) in the high order carry results 435, 436.

To do so, dual carry logic circuit 434 uses a low increment carry chain 434-a and a high increment carry chain 434-b, each of which is provided with a copy of the high order PGK result 433. Each carry chain 434-a and 434-b accepts its respective low or high increment carry bit 456 or 458 and accounts for (i.e., propagates) the carry bits within its version of the high order carry result 435, 436.

At this point in the processing of rounding adder circuit 314 the addition of operands A 401 and B 402 is nearly complete. However, there are two complete addition results present, i.e. a low increment result for the addition of operands A 401 and B 402 in conjunction with the low increment rounding bit (inserted from line 452), and a high increment result for the addition of operands A 401 and B 402 in conjunction with the high increment rounding bit (inserted from line 454). Each complete low and high increment result however is broken into a high order bit sum 471, 472 and a low order bit sum 466, 476.

The high and low order portions (i.e., 435 and 445) of the low increment carries and propagates are passed to respective high and low order low increment sum logic circuits 460 and 465. Likewise, the high and low order portions (i.e., 436 and 451) of the high increment carries and propagates are passed to respective high and low order high increment sum logic circuits 470 and 475. Each sum logic circuit 460, 465, and 470, 475 performs sum logic functions on their respective carry and propagate inputs.

Upon completion of sum logic processing, two results have been computed for the desired mathematical operation. The first result is a high increment result comprising the final high order high increment sum 471 (representing the final high order bits) and the final low order high increment sum 476 (representing the final low order bits). The second result is a final low increment result comprising the final high order low increment sum 472 (representing the high order bits) and the final low order low increment sum 466 (representing the low order bits).

Selection of one of these for the final result 405 is based on the observation that the value present in the most significant bit 468 of the final high order low increment sum 472 enables selection of either the final high increment sum (bits 471 and 476) or the final low increment sum (bits 472 and 466). The actual selection is performed by providing the most significant bit 468 to the high order output format select circuit 480 and to the low order output format select circuit 482. Output format select circuits 480, 482 operate much like multiplexors to select the proper low or high increment to produce the final result 405.

An important distinction should be noted concerning the present invention over prior art rounding adder circuits. As explained above, prior art rounding adder circuits include circuitry to compute addition results which take into account a high increment rounding bit, a low increment rounding bit, and no rounding bit increment. The value of the most significant bit in the no increment result is then used to select either the high increment result or the low increment result in the prior art. However, the present invention is based in part on the observation that a rounding adder low increment result will always need to be computed using a low increment rounding bit. If the low increment addition produces a low increment result that is normalized, then the high increment result is not needed. In other words, the invention only computes the high and low increment results and determines which result is normalized and then selects that result as the correct result.

As previously noted, the rounding adder circuit 314 is able to complete a variety of floating point mathematical operations. As an example, operations such as addition, subtraction, multiplication and division may be completed by rounding adder circuit 314. Each of these operations may be completed using one of the four types of rounding modes noted previously. Based upon the desired mathematical operation being performed and the rounding mode in effect for that operation, the exact values of the low and high increment rounding bits on lines 452 and 454 are determined.

Rounding bit lines 452 and 454 each include four bit lines, one for each of the J, K, L and R low order bit positions. Each one of the bit lines 452 and 454 serves as one of the three inputs (the other two inputs being a bit from operand A 401 and B 402) to one of the full adders 440 J through 440 R, 446 J through 446 R at a respective bit position. That is, lines 452 are set to inject a low increment rounding bit into the addition operation of operands A 401 and B 402 at one (or more) of bit positions J, K, L, R, whereas lines 454 can be set to inject a high increment rounding bit into the addition operation of operands A 401 and B 402 at another one (or more) of these bit positions. In either case, a rounding bit may be injected by setting one of bit lines 452, 454 to a high or "1" value to represent a rounding bit injected or inserted into the addition operation at that bit position.

Depending upon the mathematical operation being performed and the rounding mode in effect, the value input at bit positions J, K, L or R may depend upon the value of a lower order located bit position. The presence or absence of a bit (i.e, a high or "1" value) in the lower bit positions from a given bit position is referred to as the "stickiness" of the given bit position. In other words, the presence of a significant bit below the precision of a given bit position is defined as a state of stickiness for that given bit. For example, "sticky-to-L" is defined as the presence of a significant bit below the L bit position, whereas "sticky-to-R" is the presence of a significant bit below the R bit position, and so forth.

Recall that during the addition operation of operands A 401 and B 402, intermediate results may occur that contain more bits than the precision of the final result. Thus, during addition, a bit may exist in intermediate results below the R bit position; consequently "sticky-to-R" would be true.

The rounding modes explained previously determine how bits below a given bit position are to be handled. For example, the round to positive infinity mode rounds positive values up in magnitude if they fall between two representable final results. Accordingly, to determine if a positive result is between two final values, the stickiness of the least significant bit may be consulted (i.e., the value of a bit below the least significant bit position).

In general, the stickiness of any bit position may be determined using the following equation:

Sticky-to-bit-<n>=Sticky-to-bit-<n−1> OR bit-<n−1>

This expression can be used to increment an intermediate result at bit n when sticky-to-bit<n> by incrementing at bit n when sticky-to-bit<n−1> or incrementing at bit<n−1> when not sticky-to-bit<n−1>.

Tables 1 and 2 that follow indicate low and high round increment bit settings for certain bit positions from J, K, L and R on lines 452 and 454. These values are based on the rounding mode that may be in effect during the operation is listed across the top row of the table. The rounding modes supported are RND. NEG. INF. for round to negative infinity, RND. POS. INF. for round to positive infinity, CHOPPED for the chopped rounding mode, and VAX for the VAX rounding mode. For each rounding mode, there are two columns of bit values, each labeled at the top with a respective bit position. Note that Table 1 only shows the bit values for the low increment condition as is applied as input on lines 452.

Table 2 below indicates the high round increment bit settings for certain bit positions selected from J, K, L and R that are presented as input on lines 454 based on the rounding mode that is in effect and on the desired mathematical operation being performed by rounding adder circuit 314. Where the bit positions are not specified, they are assumed to be set to a low or "0" state.

TABLE 2

LOW ORDER HIGH INCREMENT ROUNDING BIT VALUES
BASED ON DESIRED MATHEMATICAL OPERATION AND ROUNDING
MODE IN EFFECT

|       | RND. NEG. INF. |       | RND. POS. INF. |        | CHOPPED |        | RNE/VAX |       |
|-------|----------------|-------|----------------|--------|---------|--------|---------|-------|
| INST  | K              | L     | K              | L      | K       | L      | K       | L     |
| ADD   | 0              | 1     | STK_L          | ~STK_L | 0       | 0      | 0       | 1     |
| SUB   | ~STK_L         | STK_L | 1              | 0      | 0       | ~STK_L | ~STK_L  | STK_L |
| DIV   | 0              | 1     | STK_L          | ~STK_L | 0       | 0      | 0       | 1     |
| INST  | L              | R     | L              | R      | L       | R      | L       | R     |
| MULTI | 0              | 1     | STK_L          | 0      | 0       | 0      | 0       | 1     | rounding mode that is in effect and on the desired mathematical operation being performed by rounding adder circuit 314. In the following tables, certain bit values depend upon the stickiness of a bit position and are labeled "stk_?", where the "?" is replaced with the letter of the bit position of concern. For example, "stk_r" means sticky to, but not including, the R bit position. Thus, if there is a significant bit in the intermediate result that exists below the R bit position, then "stk_r" is true. A tilde "~" represents the inverse of the value following the tilde. Thus, "~stk_r" means the inverse or opposite of "stk_r". So if "stk_r" is true then "~stk_r" is false. Where the bit positions are not specified in the table, they are assumed to be false. For IEEE RNE mode, if either sum (466 or 476) is exactly half-way between 2 adjacent representable values, the LSB of that sum is cleared.

As stated above, Table 2 only shows the bit values for the high increment condition as applied to lines 454, whereas Table 1 indicates the values for the low increment condition on lines 452.

During operation of rounding adder circuit 314, once the desired mathematical operation is selected and the rounding mode in effect for the processor has been determined, the values for the bit positions given at the corresponding locations in Tables 1 and 2 are applied as input on bit lines 452 and 454, respectively. For instance, to perform effective addition (ADD) with rounding adder circuit 314, using the round to negative infinity rounding mode (RND. NEG. INF.), low increment bit positions L and R on low increment bit lines 452 would be set to "0" and "1", respectively, while high increment bit positions K and L on high increment bit lines 454 would be set to "0" and "1", respectively. In this

TABLE 1

LOW ORDER LOW INCREMENT ROUNDING BIT VALUES
BASED ON DESIRED MATHEMATICAL OPERATION AND ROUNDING
MODE IN EFFECT

|       | RND. NEG. INF. |       | RND. POS. INF. |        | CHOPPED |        | RNE/VAX |       |
|-------|----------------|-------|----------------|--------|---------|--------|---------|-------|
| INST  | L              | R     | L              | R      | L       | R      | L       | R     |
| ADD   | 0              | 1     | STK_R          | ~STK_R | 0       | 0      | 0       | 1     |
| SUB   | ~STK_R         | STK_R | 1              | 0      | 0       | ~STK_R | ~STK_R  | STK_R |
| DIV   | 0              | 1     | STK_R          | ~STK_R | 0       | 0      | 0       | 1     |
| INST  | R              | G     | R              | G      | R       | G      | R       | G     |
| MULTI | 0              | 1     | STK_R          | 0      | 0       | 0      | 0       | 1     |

In Table 1, various mathematical floating point operations are listed in the left hand column. The operations are ADD for effective addition, SUB for effective subtraction, DIV for division and MULTI for multiplication. Each possible manner, the rounding adder circuit 314 would properly compute the addition of operand A 401 by B 402 while using the round to negative infinity rounding mode.

By injecting the rounding bits into both a low and high order pre-selected bit position via lines 452 and 454 according to Tables 1 and 2, and by using full adders 440-R, 440-S, 446-L, 446-R to accommodate these extra bits, both high and low increment sums 471, 472 are obtained from the high and low increment sum logic circuit 470 and 460. One of these sums 471, 472 is selected as the correct sum by using the most significant bit 468 from the low increment sums 472. As stated earlier in this manner, there is no need for a no increment sum calculation, as is done in prior art rounding adders. By eliminating the extra processing required by the prior art, the overall floating point processor cycle time is reduced. Moreover, the use of full adder circuits 440, 446 greatly simplifies the circuit design and operation by accommodating the rounding bit as a third input at the start.

Another advantage of the invention is inherent in the ability to inject a bit value at any one or more of the bit positions J, K, L or R due to the use of the full adders 440, 446. The advantage of this ability is that it is possible to combine a two's complement increment bit with the rounding operation without incurring any additional delay and/or complexity in the rounding adder circuit 314. As previously noted, addition of operands A 401 and B 402 may require a step of performing a two's complement on one of the operands in order to perform effective subtraction. This is done by inverting the bits and incrementing at the least significant bit position. Since the rounding adder circuit 314 provides a convenient mechanism for incrementing at the least significant bit position L, the two's complement step can be effectively merged into the operation of the rounding adder circuit 314. This folds the two's complement step into the rounding operation and further increases the floating point processor operation while reducing complexity.

In a related embodiment, the rounding adder circuit 314 allows the injection of bit values at any desired bit position in the entire operands. As illustrated in the preferred embodiment, J, K, L and R are the only bit positions having the capability to accept bit insertion of a bit value. However, with a simple modification of converting any of the half adders in half adder circuit 430 to full adders, for one or more bit positions, any bit positions using full adders can accommodate increment bits that may be beneficial in a variety of circumstances. For example, a method of rounding marginally denormalized results requires the addition of a round increment at certain bit positions not needed for normalized results. Thus, if a non-normalized number needs to be incremented, the bit increment position may not correspond to one of the J, K, L or R positions. As such, the bit position to which it does correspond may be equipped with a full adder instead of a half adder to accommodate the extra bit increment.

In another related embodiment, it is possible to multiplex the LINC and HINC carries (435 and 436) based upon a predetermined version of the MSB of the LINC sum (460), using the multiplexor output to drive common sum logic, thereby merging the LINC and HINC sum logic (460 and 470).

Alternatively, the predetermined version of the MSB could be used to conditionally enable the HINC carries, permitting merging of the LINC and HINC sum logic, as well as portions of the LINC and HINC carry logic.

FIGS. 1, 2, and 3 are for purposes of illustration and are not limiting of the general relation between a Floating Point Execution Unit, CPU, and a computer system. Rather, the floating point unit circuit 314 of FIG. 4 is meant to be applicable to any type of microprocessor or computing circuit architecture requiring floating point calculations.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An apparatus for performing rounded floating point mathematical operations on first and second operands, the apparatus comprising:

a low increment adder circuit accepting as input the first and second operands and a low increment bit injected into a first pre-selected low order bit position, the low increment adder circuit adding the first and second operands and the low increment bit, and accounting for any carry bits generated and producing a low increment result;

a low increment sum logic circuit performing sum logic functions on the low increment result to produce a final low increment result;

a high increment adder circuit accepting as input the first and second operands and a high increment bit injected into a second pre-selected low order bit position, the high increment adder circuit adding the first and second operands and the high increment bit, and accounting for any carry bits generated and producing a high increment result;

a high increment sum logic circuit performing sum logic functions on the high increment result to produce a final high increment result;

an output selection circuit selecting one of the final low increment result and the final high increment result depending upon a most significant bit of the final low increment result;

wherein the first and second pre-selected low order bit positions are selected based upon a function of a rounding mode in effect and upon the desired mathematical operation.

2. The apparatus of claim 1 wherein the low increment adder circuit and the high increment adder circuit share a high order bit addition circuit comprising:

a plurality of half adders coupled in sequence, one half adder per high order bit position in the first and second operands, each half adder accepting as input a respectively positioned high ordered bit from each of the first and second operands, and each half adder performing an addition operation and producing a half adder result for that bit position;

a plurality of high order propagate-generate-kill circuits coupled in sequence, one propagate-generate-kill circuit per high order bit position in the operands, each high order propagate-generate-kill circuit accepting as inputs the half adder sum and carry from the appropriate bit position and performing one of propagating, generating or killing a carry bit for its respective bit position to produce a high order PGK result.

3. The apparatus of claim 2, wherein the low increment adder circuit further comprises:

a plurality of low increment full adders coupled in sequence, one per low order bit position of the first and second operands, each low increment full adder accepting as input a respectively positioned low ordered bit from the first operand, a respectively positioned low ordered bit from the second operand, and the low increment bit, each low increment full adder performing an addition operation and producing a low increment full adder result for that bit position;

a plurality of low increment propagate-generate-kill circuits coupled in sequence, one per low order bit position in the operands, each low increment propagate-generate-kill circuit accepting the low increment full adder sum and carry from the appropriate bit position and performing one of propagating, generating or killing a carry bit for its respective bit position to produce a low increment PGK result.

4. The apparatus of claim 3, wherein the high increment adder circuit further comprises:

a plurality of high increment full adders coupled in sequence, one per low order bit position of the first and second operands, each high increment full adder accepting as input a respectively positioned low ordered bit from the first operand, a respectively positioned low ordered bit from the second operand, and the high increment bit, each high increment full adder performing an addition operation and producing a high increment full adder result for that bit position;

a plurality of high increment propagate-generate-kill circuits coupled in sequence, one per low order bit position in the operands, each high increment propagate-generate-kill circuit accepting the high increment full adder sum and carry from the appropriate bit position and performing one of propagating, generating, or killing a carry bit for its respective bit position to produce a high increment PGK result.

5. The apparatus of claim 4 further including:

a low increment carry logic circuit accepting as input the low increment PGK result and producing a low increment carry result for a high order low increment carry chain and a low order low increment sum logic circuit;

a high increment carry logic circuit accepting as input the high increment PGK result and producing a high increment carry result for a high order high increment carry chain and a low order high increment sum logic circuit;

a dual carry logic circuit including:
    a low increment carry chain combining the high order PGK result with the low increment carry result to propagate the low increment carry result within the high order PGK result to produce a high order low increment result; and
    a high increment carry chain combining the high order PGK result with the high increment carry result to propagate the high increment carry result within the high order PGK result to produce the high order high increment result.

6. The apparatus of claim 5, wherein:

the low increment sum logic circuit includes:
    low order low increment sum logic circuitry accepting a low order low increment result from the low increment carry logic circuit and performing the sum logic finction on the low order low increment result to produce a final low order low increment result;
    high order low increment sum logic circuitry accepting a high order low increment result from the dual carry logic circuit and performing the sum logic function on the high order low increment result to produce a final high order low increment result; and
    wherein the final low order low increment result and the final high order low increment result combine to form the final low increment result; and wherein the high increment sum logic circuit includes:
    low order high increment sum logic circuitry accepting a low order high increment result from the high increment carry logic circuit and performing the sum logic function on the low order high increment result to produce a final low order high increment result;
    high order high increment sum logic circuitry accepting a high order high increment result from the dual carry logic circuit and performing the sum logic function on the high order high increment result to produce a final high order high increment result; and
    wherein the final high order high increment result and the fmal low order high increment result combine to form the fmal high increment result.

7. The apparatus of claim 1, wherein the first and second operands each respectively include four low order bit positions respectively referred to as low order bit positions J, K, L and R, from which the first and second pre-selected low order bit positions are selected for injection of the low and high increments bits;

wherein the rounding mode in effect may be one of round-to-negative-infinity, round to positive infinity, chopped, IEEE RNE, or VAX; and wherein the desired mathematical operation is one of effective-add, effective-subtract, multiply or divide.

8. The apparatus of claim 7, wherein when the desired mathematical operation is one of addition, subtraction and division, the low order low increment bit positions L and R are selected from pre-determined values.

9. The apparatus of claim 7, wherein when the desired mathematical operation is multiplication, the low order low increment bit positions R and G are selected from predetermined values.

10. The apparatus of claim 7, wherein when the desired mathematical operation is one of addition, subtraction and division, and the low order high increment bit positions K and L are selected from predetermined values.

11. The apparatus of claim 7, wherein when the desired mathematical operation is multiplication, the low order high increment bit positions L and R are selected from predetermined values.

12. The apparatus of claim 7, wherein when the desired mathematical operation is one of addition, subtraction, division and multiplication, the certain low order low increment bit position values and certain low order high increment bit position values are determined based on a stickiness of a bit position.

13. A method of performing a desired floating point mathematical operation on first and second operands, the method comprising the steps of:

accepting the first and second operands as input;

accepting a high increment bit as input at a high increment bit position;

accepting a low increment bit as input at a low increment bit position;

adding the bits of the first operand and the second operand at corresponding bit positions other than the low and high increment bit positions using half adders to produce a high order addition result;

adding the bits of the first operand and the second operand and the high increment bit at the high increment bit position using at least one full adder and accounting for a high increment carry bit in modifying the high order addition result;

adding the bits of the first operand and the second operand and the low increment bit at the low increment bit position using at least one full adder and accounting for a low increment carry bit in modifying the high order addition result;

using sum logic circuitry to operate on the high order addition result to complete the desired floating point mathematical operation to produce a high increment sum and a low increment sum;

selecting between the high increment sum and the low increment sum using a most significant bit from the low increment sum.

14. The method of claim 13, wherein the step of accepting the first and second operands as input divides low order bits in the first and second operands into a set of low order low increment bits and a set of low order high increment bits; and wherein the step of accepting a high increment bit as input at a high increment bit position accepts a series of bits, at least one of which includes the high increment bit, said series corresponding one to one with the set of low order high increment bits; and wherein the step of accepting a low increment bit as input at a low increment bit position accepts a series of bits, at least one of which includes the low increment bit, said series corresponding one to one with the set of low order low increment bits.

15. The method of claim 14, wherein the high increment bit position and the low increment bit position are determined based upon the desired floating point mathematical operation being performed.

16. The method of claim 15, wherein the high increment bit position and the low increment bit position are determined based upon a rounding mode that is in effect for the desired floating point mathematical operation being performed.

17. The method of claim 13 wherein the steps of adding further comprise the steps of:

propagating, generating and killing increment carry bits as necessary to properly determine values of individual bit positions;

carrying bits from lower order bit positions to higher order bit positions to determine a result.

18. An apparatus for performing a desired mathematical operation on two floating point operands, the apparatus comprising:

means for accepting as input two fraction bit fields of the two floating point operands as well as a set of low increment rounding bits and a set of high increment rounding bits;

means, using low increment carry circuitry, for combining the two floating point operands in conjunction with the low increment rounding bits and for using high increment carry circuitry to combine the two floating point operands in conjunction with the high increment rounding bits to produce a low increment carry and a high increment carry;

a sum logic circuit including:

means for accepting the low increment carry and the high increment carry and for performing a portion of the desired mathematical operation to produce a low increment sum and a high increment sum; and means for selecting one of the low increment sum or the high increment sum as the final result.

* * * * *